Dec. 26, 1939. S. M. BAGNO ET AL 2,184,511
METHOD AND APPARATUS FOR MEASURING IMPEDANCE
Filed Oct. 28, 1937   2 Sheets-Sheet 1
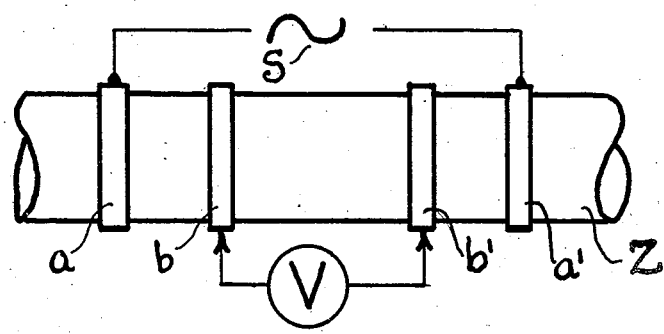
~Fig. 1~
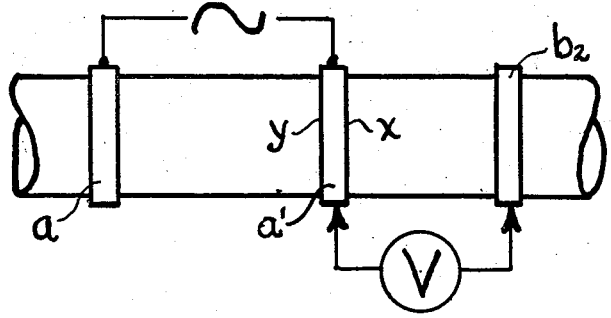
~Fig. 2~
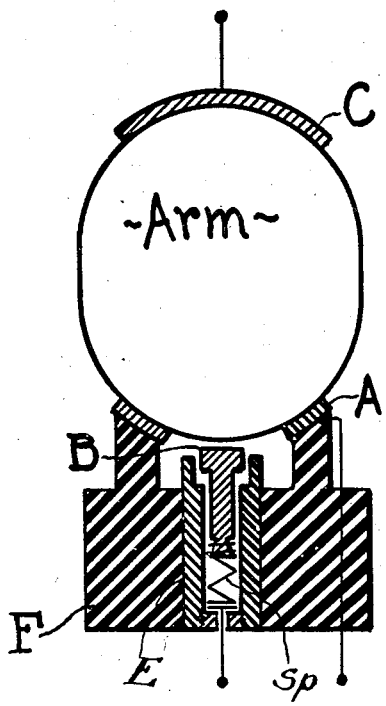
~Fig. 3~
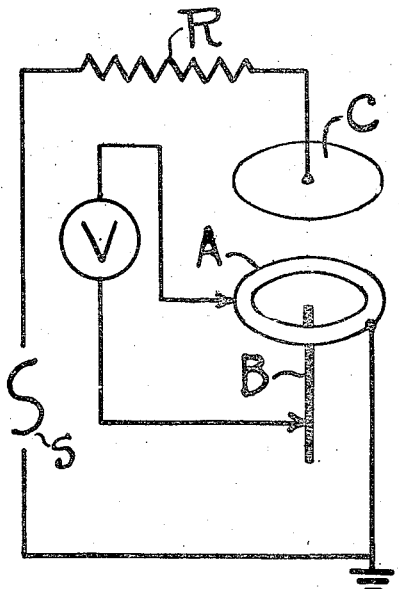
~Fig. 4~
~Fig. 5~
Samuel M. Bagno
Abraham Barnett
INVENTOR
BY Louis Barnett
ATTORNEY Patented Dec. 26, 1939

2,184,511

UNITED STATES PATENT OFFICE 2,184,511

METHOD AND APPARATUS FOR MEASURING IMPEDANCE

Samuel M. Bagno, New York, and Abraham Barnett, Brooklyn, N. Y.

Application October 28, 1937, Serial No. 171,438

10 Claims. (Cl. 175—183)

The present invention relates to methods and apparatus for measuring impedance and impedance components and, more particularly, to the measurement of these quantities on the human or other animal body. The subject matter is, in part, a continuation of copending application, Serial Number 8,841, filed March 1, 1935, now Patent No. 2,111,135.

One of the objects of the invention is to provide methods and apparatus for measuring the impedance properties of a conductor through an insulating sheath.

Another object is to provide methods and apparatus for measuring impedance properties of an insulating sheath while in place on a conductor.

A further object is to provide methods and apparatus for measuring the impedance properties of either the deep tissues or the skin to the exclusion of one another on the human or animal body.

Still further objects will appear in the course of the detailed description now to be given with reference to the accompanying drawings, in which:

Figure 1 is a diagram showing the general method employed for measuring the impedance properties of a conductor while enclosed in an insulating sheath;

Figure 2 is a diagram illustrating the procedure to be followed when it is desired to measure the impedance properties of an insulating sheath while in place on a conductor;

Figure 3 represents, in section, a preferred form of the invention for measuring the impedance properties of the skin to the exclusion of its supporting tissues;

Figure 4 is an end view of the concentric type of electrode represented in Figure 3;

Figure 5 illustrates, diagrammatically, a simplified circuit used in making measurements by the method represented in Figures 3 and 4.

Figure 6:
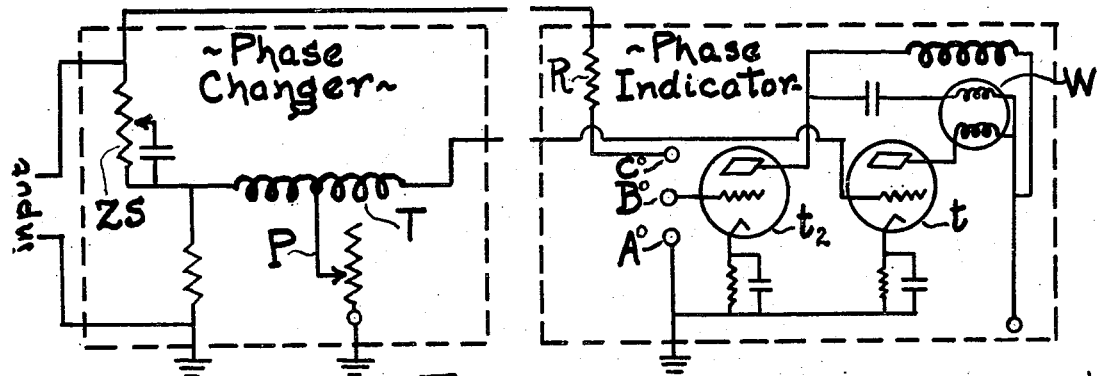
Figure 6 is a wiring diagram showing one illustrated embodiment of the invention, a wattmeter or a cathode ray tube being included as an indicating instrument.

In the description which is to be given, the invention will be described with particular reference to measurements on the human body, but it is to be understood that it is equally applicable to biological materials of any kind such as nerve trunks and nerve fibres of animals or to non-living systems wherein a low impedance conductor is enclosed in a high impedance sheath.

The skin is known to be a relatively poor electrical conductor. The muscles and deep tissues, on the contrary, are relatively good conductors. This difference in conducting properties may be taken advantage of to measure the impedance properties of either one to the exclusion of the other.

Referring to Figure 1 of the drawings, there is shown a body segment such as the arm Z, a pair of current supplying band electrodes $a$, $a'$ encircling segment Z and provided with alternating current from an appropriate source S, a pair of voltage tapping band electrodes $b$, $b'$ positioned on segment Z inside of electrodes $a$, $a'$ and a voltmeter V with its terminals applied to electrodes $b$, $b'$. The purpose of the electrode arrangement shown in Figure 1 is to permit measurements of the deep tissues over any desired length of a body segment through the skin. As will be seen from the figure, the current supplied to electrodes $a$, $a'$, traverses the skin and flows through the deep tissues. When voltages are tapped off, through electrodes $b$, $b'$, the effect of the contact impedance due to the skin is eliminated and the voltmeter reading may be made proportional to the impedance of the deep tissue segment lying between these electrodes provided precaution is taken (1) to maintain the current supply to electrodes $a$, $a'$ constant and (2) to use a voltmeter (vacuum-tube type) of such high internal resistance that the impedance of the skin areas in contact with electrodes $b$, $b'$ is negligible in comparison.

If it be desired to measure the impedance properties of the skin to the exclusion of the deep tissues, the electrode arrangement shown in Figure 2 may be used. Here, current is supplied as before to electrodes $a$, $a'$, and voltages are tapped off between electrode $a'$ and a band electrode $b_2$ placed to one side. Since one of the voltage and one of the current terminals are common, the voltage drop indicated by voltmeter V represents the drop in potential through the skin.

The electrode set-up shown in Figure 2 is found to give correct impedance values only at frequencies up to 2,000 to 3,000 cycles. The reason for this is that, as the frequency is raised, if electrode $a'$ has any appreciable width, a potential gradient is set up between the edges $x$ and $y$. In order to reduce or eliminate the effect of potential gradients of this kind at frequencies above 2,000 cycles, the electrode arrangement shown in Figure 3 has been adopted.

As will be seen from the drawings, an annular electrode A composed of Monel metal and covered with outing flannel is mounted on one side of the arm and a solid disc electrode C also covered with flannel on the other side. Current is supplied to these two electrodes through any convenient form of current limiting device such as resistance R (10,000 ohms) from a source S. A carbon electrode B is mounted in the centre of the annulus and the voltages tapped from electrode A and B are fed to a vacuum tube voltmeter V calibrated in ohms at the frequency employed. Since voltage tapping electrode B lies within the limits of current electrode A and at a constant distance from its limiting edges, the effect of voltage gradients is reduced to a minimum.

In practice, the following electrode dimensions have been found to give satisfactory results: The outside and inside diameters of electrode A are 34 and 20 mm. respectively; disc electrode C is also 34 mm. in diameter; the contact end of carbon electrode B is 6 mm. in diameter. In order to insure good contact of electrode B with the skin, a light bronze spring $Sp$ is mounted to exert endwise pressure thereon. Elements B and $Sp$ are mounted conveniently in an insulating shell E and the ensemble of annulus A and shell E may be supported on a common insulating support F. In order that electrode A make perfect contact with the skin without exerting too much pressure thereon, it should be bent into slightly cylindrical form to fit the arm. It is immaterial whether electrode C be flat or bent since perfect contact thereof with the skin is unnecessary.

In making an actual measurement of the skin impedance, composite electrode A—B and disc C are first soaked in 1% sodium chloride solution and then applied to opposite sides of the arm as shown in Figure 3. During the first minute or two that the electrodes are in place, the voltage drop indicated by voltmeter V gradually decreases due to the diminution in contact resistance while the saline is soaking into the epidermis. At the end of a variable time, usually less than two minutes, the voltmeter reading becomes constant and may be taken to represent the impedance of the skin area under electrode A.

In the foregoing description, the results obtained are in terms of the total impedance. In physiological and clinical investigations, it is frequently desirable to measure the separate components of this total impedance. For this purpose, either one of two theoretical procedures are possible; (1) the equivalent parallel or series resistance and reactance may be measured or (2) measurements may be made of the impedance and phase angle. Since the nature of the circuit being measured is unknown (skin and deep tissues), the second of these procedures is to be preferred, the impedance and the phase angle each representing absolute properties of a circuit irrespective of its internal structure. In Figures 1, 2 and 3 the necessary methods and apparatus for measuring the impedance of deep tissue segments and of the skin have already been given. There remains only to describe the corresponding methods and apparatus for measuring the phase angle of each of these impedances.

The apparatus shown in Figure 6 is a slightly modified form of phasemeter described in co-pending application Ser. No. 8,841, filed March 1, 1935, and is especially convenient for measuring large phase angles such as those of the skin which are of the order of 60°–80°. It consists of (1) an oscillator section (not shown) supplying substantially harmonic free oscillations to (2) a phase rotating or phase changing section and (3) a phase indicating section containing a wattmeter or a cathode-ray tube. The oscillator may be of the Hartley series or any other convenient type. The output of the oscillator section is split into two parts, one going to the phase rotating, and the other to the phase indicating, section. The phase rotating section includes a zero-set phase rotating resistor and condenser ZS in series with a center-tap transformer T and a potentiometer P connected directly to ground as shown. Elements T and P serve as the main phase rotator, P being calibrated to read phase angle. One terminal of the transformer is connected to the grid of a tube $t$, whose plate circuit is in series with one coil of wattmeter W or, if a cathode ray tube is used, with one pair of deflecting plates. The phase indicating section is provided with a large resistor R receiving current from the oscillator section and connected in series with terminals $C^0$ and $A^0$. A third terminal $B^0$ is in circuit with a tube $t_2$ whose plate circuit is connected to the second wattmeter coil as shown or, if a cathode-ray tube is used, controls the second pair of deflecting plates of the latter.

In making a phase angle measurement of the skin, the electrodes are mounted on the arm as shown in Figure 3 and, with potentiometer P set to read 90°, a condenser is connected to the phasemeter with terminals $B^0$ and $C^0$ both contacting one side of the condenser and grounded terminal $A^0$ the other side. Zero-set ZS is then adjusted so that the wattmeter reads zero or, if a cathode ray tube is used, so that the latter indicates zero phase. The condenser is then removed and terminals $A^0$, $B^0$ and $C^0$ are connected to electrodes A, B and C respectively. The voltage difference tapped off from electrodes B and A is impressed on the grid of tube $t_2$ and it suffices to adjust potentiometer P so as to vary the voltage impressed on the grid of tube $t$, to bring the indicating instrument back to zero. Potentiometer P, being calibrated to read phase angles directly, gives the value of the skin phase angle. Because of large resistance R in series with the arm, the readings are independent of differences or variations in arm impedance.

It will be noted that, by short circuiting terminals $B^0$ and $A^0$ of the phasemeter, it is converted into the type of instrument described in the co-pending application already referred to.

Figure 7:
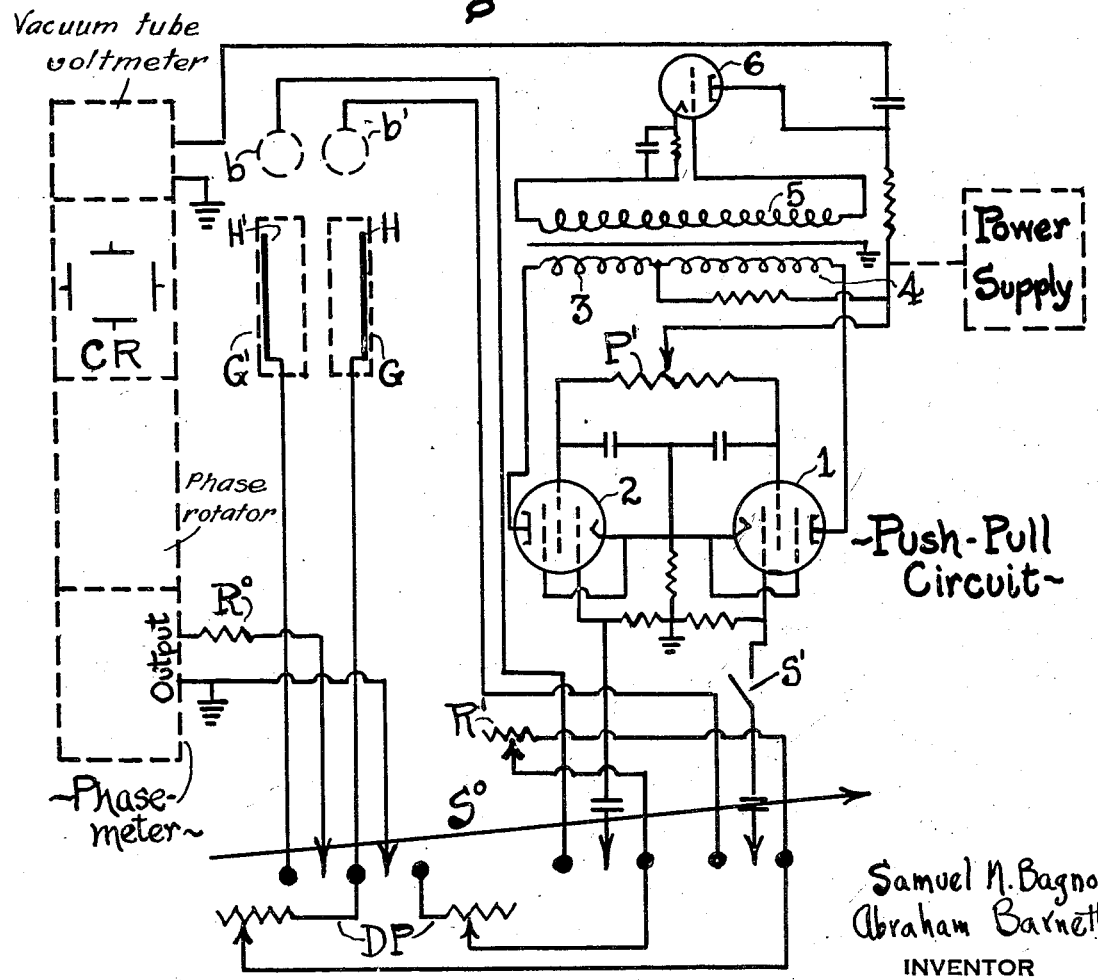
Figure 7 is a wiring diagram of a phasemeter and push-pull circuit connected together to make phase and impedance measurements by the methods shown in Figures 1 and 2.

The form of apparatus shown in Figure 7 is particularly useful in measuring the impedance and the phase angle of a body segment according to the method represented in Figure 1. This instrument is built around a phasemeter such as is shown in Figure 6 fitted preferably with a cathode ray type of indicating device. The phasemeter includes, as before, an oscillator section (not shown), a phase-rotating section, a cathode ray indicating section CR and a vacuum-tube voltmeter whose terminals are connected across the output of the phasemeter. The assembly is completed by a push-pull circuit with an appropriate power supply and a 4-pole double-throw switch $S^0$ permitting comparison of the body segment being measured with a variable non-inductive resistance R'. A pair of arm-baths G, G' containing 1% saline and fitted with tin electrodes H, H' permit connection to the body to be made when the subject immerses one hand into each arm bath, the latter serving the same purpose as band electrodes $a, a'$ in Figure 1.

To make a measurement, band electrodes $b, b'$ consisting of ordinary solder wire are placed around the body segment in spaced relation so as to delimit that portion of the body it is desired to measure (Fig. 1) and connections are made via switch $S^0$ as shown in Figure 7 so that the voltages tapped off may be fed to the grids of pentode tubes 1 and 2. The plate circuits of these tubes are in series with a pair of coils 3 and 4 which react on a pick-up coil 5 connected via amplifying tube 6 to the V—T voltmeter and cathode ray plates of the phasemeter. When switch $S^0$ is thrown to the left, the output of the phasemeter feeds current to the arm-baths via a current limiting resistance $R^0$ (10,000 ohms) and, at the same time, the voltages tapped off at $b, b'$ are impressed on tubes 1 and 2. When thrown to the right, switch $S^0$ diverts the phasemeter output into a double potentiometer DP composed of two 500 ohm wire wound resistors mounted in tandem and connected to the terminals of variable non-inductive rheostat $R'$, the voltage drop across the latter feeding tubes 1 and 2 as before.

The complete sequence of operations for measuring the impedance and phase angle of the body segment are the following: With switch $S^0$ thrown to the right, rheostat $R'$ and double potentiometer DP are set to zero and a potentiometer $P'$ connected across the screen grids of pentodes 1 and 2 is adjusted so that the voltages set up in coils 3 and 4 oppose and cancel one another, i. e., the voltage generated in pick-up coil 5 is zero. An auxiliary switch $S'$ controlling the input to tube 1 is then thrown open and main switch $S^0$ is shifted to the left to divert the output of the phasemeter into the arm baths and the body. The V—T voltmeter reading is noted at this time and switch $S^0$ is thrown back to the right to bring double potentiometer DP into circuit to replace the body. It will be noted that the V—T voltmeter reading is no longer the same. DP is then adjusted so that the voltmeter reading is the same as observed when the body was in circuit. The purpose of these operations is to insert in series with rheostat $R'$, sufficient resistance to produce a potential difference matching the above-ground potential of band electrode $b'$ (Fig. 1). The adjustment of DP being effected as indicated, auxiliary switch $S'$ is again closed and main switch $S^0$ is again thrown to the left to bring the body into circuit. The V—T voltmeter is again read at this point and switch $S^0$ is thrown to the right to substitute elements DP and $R'$ for the body. The V—T voltmeter reading will be found to have changed and rheostat $R'$ is varied until the voltmeter reading is identical with the one just previously observed when the body was in circuit. At this stage the resistance setting of rheostat $R'$ corresponds to the impedance of the segment includes between bands $b$ and $b'$.

To measure the phase angle of this impedance, with current flowing through rheostat $R'$ (which is a pure resistance), zero-set ZS (Fig. 6) is adjusted so that the cathode ray tube has a linear image (zero phase angle) and switch $S^0$ is thrown to the left to substitute the body segment being measured for rheostat $R'$. Since the resistance setting of $R'$ is equal to the impedance of the segment in question, this amounts to substituting an impedance having a reactive component for a pure resistance of equal value. The resulting difference in phase will show on the cathode-ray tube as an ellipse and, by adjusting phase rotating potentiometer P (Fig. 6), the cathode ray image may be changed back to indicate zero phase angle. Potentiometer P being calibrated in terms of phase angle, the amount of adjustment in P is a direct indication of the phase angle of the body segment.

It will be seen that the net effect of the various operations herein above described is to compare the voltage drop between electrode $b$ and $b'$ with the voltage drop through resister $R'$, the voltages compared being each fed to the grids of tubes 1 and 2. The function of double potentiometer DP is merely to provide a voltage drop in series with rheostat $R'$ corresponding to the above ground potential of voltage tapping electrode $b'$. Otherwise expressed, the body segment to be measured is compared by substitution with resisters connected together to simulate the properties of the body segment itself. It will be noted, however, that the resisters in question have no reactive component, whereas the body segment under test is somewhat reactive. The push-pull circuit permits comparison of the body impedance with a pure resistance of equal ohmic value, the phasemeter serving to measure the amount by which the body impedance differs from a pure resistance. The details of the push-pull circuit are shown in Figure 7 and need not be described since, as will be obvious to those skilled in the art, they may be varied as to value and design in accordance with the particular combination of conductor and dielectric under test. The dimensions given for the concentric electrode represented in Figure 3 were chosen for the particular case of measurements made on human skin in the vicinity of 10,000 cycles. Should it be desired to apply the invention to other dielectrics in contact with conductors, these electrode dimensions may be varied provided the leakage resistance along the dielectric surface between electrodes A and B is very large in comparison with the transverse resistance of the dielectric area lying beneath electrode A, i. e., so that the transverse resistance in question is negligible in comparison to the longitudinal resistance between A and B.

We claim:

1. The method of measuring the impedance properties of a dielectric while in contact with a conductor comprising the steps of feeding an alternating current through two points on the surface of said dielectric and measuring the difference of potential between one of said points and a third point on the surface of said dielectric located outside the space lying between the two current input points.

2. The method of measuring the impedance properties of a dielectric while in contact with a conductor comprising the steps of feeding an alternating current through the surface of said dielectric at two portions of the surface thereof, one of said surface portions forming an enclosed area, and tapping off a voltage between the inside of said enclosed area and that portion of the dielectric surface bounding said enclosed area, said voltage being tapped off through the dielectric.

3. The method of making comparative measurements of similar dielectric materials enclosing conductors of different impedance comprising the steps of passing an alternating current through two portions of the surface of one of said dielectrics in series with a resistance sufficiently large so that when the same alternating current is caused to flow through two portions of the surface of said second dielectric, the value of the current remains substantially constant, and tapping off a voltage between one of the portions of the surface of said first dielectric through which the alternating current is being fed and also from a third portion of the surface of said first dielectric.

4. An apparatus for measuring the impedance properties of a dielectric while in contact with a conductor comprising a source of alternating current, means for feeding said current through two spaced portions on the surface of said dielectric, and means positioned to tap off a voltage between one of the portions of the surface of said dielectric through which current is being fed and a third portion of the surface of said dielectric located outside the space between said two spaced portions through which current is being fed.

5. An apparatus for measuring the impedance properties of a dielectric while in contact with a conductor comprising a source of alternating current, a pair of electrodes adapted to be mounted in contact with said dielectric in spaced relation, one of said electrodes having the form of an annulus, a third electrode having one extremity thereof extending into the opening of said annulus and means for measuring a difference of potential between said third electrode and said annulus.

6. An apparatus for measuring the impedance properties of a dielectric while in contact with a conductor comprising a source of alternating current, a pair of electrodes adapted to be mounted in contact with the surface of said dielectric and a third electrode positioned to be mounted in contact with said dielectric and in such relation to one of said first named electrodes that, when a potential is picked off between said third electrode and one of the other two, the total drop of potential through the dielectric is obtained.

7. An apparatus for measuring the impedance properties of a dielectric comprising a source of alternating current, a pair of electrodes adapted to be mounted in spaced relation on the surface of said dielectric, one of said electrodes being hollow, a third electrode mounted to fit into the hollow portion of said last named electrode and means for tapping off a voltage between said third electrode and the electrode within which it is mounted.

8. An apparatus as defined in claim 4 in combination with a phasemeter including means for measuring directly the difference in phase between said current and said voltage.

9. An apparatus as defined in claim 4 in combination with current limiting means connected to said alternating current source and operative to maintain the value of said current constant for dielectrics of differing impedance.

10. A composite electrode composed of an annular conductor covered with a water absorbing material and a second conductor extending into the hollow portion of said annular conductor.

SAMUEL M. BAGNO.
ABRAHAM BARNETT.